US008478260B2

(12) United States Patent
Gilson

(10) Patent No.: US 8,478,260 B2
(45) Date of Patent: Jul. 2, 2013

(54) CALLBACK TOKENS FOR DROPPED CALLS

(75) Inventor: Ross Gilson, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 53 days.

(21) Appl. No.: 13/192,200

(22) Filed: Jul. 27, 2011

(65) Prior Publication Data

US 2013/0029656 A1    Jan. 31, 2013

(51) Int. Cl.
*H04M 11/00* (2006.01)

(52) U.S. Cl.
USPC ............ 455/421; 455/436; 455/445; 370/331

(58) Field of Classification Search
USPC ........... 455/436–444, 421, 445; 370/331–334
See application file for complete search history.

(56) References Cited

U.S. PATENT DOCUMENTS

| 6,571,092 B2 | 5/2003 | Faccin |
| 6,690,672 B1 | 2/2004 | Klein |
| 2004/0127251 A1 | 7/2004 | Thakkar et al. |
| 2004/0192252 A1 | 9/2004 | Aerrabotu |
| 2007/0274488 A1* | 11/2007 | Callaghan ............... 379/201.01 |
| 2009/0286534 A1 | 11/2009 | Garg |
| 2010/0215159 A1 | 8/2010 | Milton |
| 2011/0039552 A1 | 2/2011 | Narasimha et al. |
| 2011/0143736 A1* | 6/2011 | Winter et al. .................. 455/416 |

FOREIGN PATENT DOCUMENTS

WO    2009/070718 A1    6/2009

OTHER PUBLICATIONS

Extended European Search Report—EP12176080.5—Mailing date: Jan. 3, 2013.

* cited by examiner

*Primary Examiner* — Vladimir Magloire
(74) *Attorney, Agent, or Firm* — Banner & Witcoff, Ltd.

(57) ABSTRACT

A method and system that support re-establishing a dropped call or communication is disclosed. A terminal may publish its parameters to other terminals through in-band or out-of-band signaling. Token values may then be determined by a weighted sum of parameters, where the terminal having the largest weighted sum possesses the token. If the call or communication drops, the terminal possessing the token then initiates communication to the other terminals. In addition, a plurality of tokens may be used when there are more than two terminals in a call. The terminals may be partitioned into groups, where one of the terminals in each group possesses a token.

13 Claims, 12 Drawing Sheets

US 8,478,260 B2

CALLBACK TOKENS FOR DROPPED CALLS

TECHNICAL FIELD

Aspects of the disclosure relate to re-establishing a dropped call in a communications system.

BACKGROUND

One objective of a communications system is providing reliable service with a high degree of quality for transmission of communications such as a telephone call.

Experiencing too many dropped communications is often one of the most common customer complaints received by service providers. Service providers have attempted to address the complaint in various ways, including expansion of their home network coverage, increased cell capacity, and offering refunds for individual dropped calls. Traditional systems may incorporate a signal booster system to reduce problems due to dropped calls and dead zones or other options including wireless units and antennas to aid in strengthening weak signals.

BRIEF SUMMARY

The following presents a simplified summary of the disclosure in order to provide a basic understanding of some aspects. It is not intended to identify key or critical elements of the disclosure or to delineate the scope of the disclosure. The following summary merely presents some concepts of the disclosure in a simplified form as a prelude to the more detailed description provided below.

Some embodiments of the disclosure facilitate re-establishing data transmission such as a dropped call in a communications system. A terminal may publish its parameter to other terminals through in-band or out-of-band signaling. Token values may then be determined by the participating terminals in the call by a weighted sum of the parameters, where the terminal having the largest weighted sum possesses the token. If a call drops, the terminal possessing the token initiates callback to the other terminals.

In another aspect of the disclosure, a plurality of tokens may be used when the number of terminals in a call is greater than two. The terminals may be partitioned into groups, where one of the terminals in each group possesses a token. If a call drops, for example, the call is re-established by combining a larger and larger number of terminals similar to a pyramiding structure.

In another aspect of the disclosure, processing requirements on terminals may be reduced by performing processing at the network. For example, if some of the terminals are legacy terminals, the network may serve as a proxy, where the proxy interacts with feature-capable terminals when determining which terminal possesses the token. Furthermore, rather than the terminals themselves initiating the re-establishment of communications such as a dropped call, the network may perform call processing to support the callback feature. The network then conditionally re-establishes the call based on at least one parameter that characterizes the terminals.

Other embodiments can be partially or wholly implemented on a computer-readable medium, for example, by storing computer-executable instructions or modules, or by utilizing computer-readable data structures.

Of course, the methods and systems of the above-referenced embodiments may also include other additional elements, steps, computer-executable instructions, or computer-readable data structures. In this regard, other embodiments are disclosed and claimed herein as well.

The details of these and other embodiments are set forth in the accompanying drawings and the description below. Other features and advantages of the disclosure will be apparent from the description and drawings, and from the claims.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
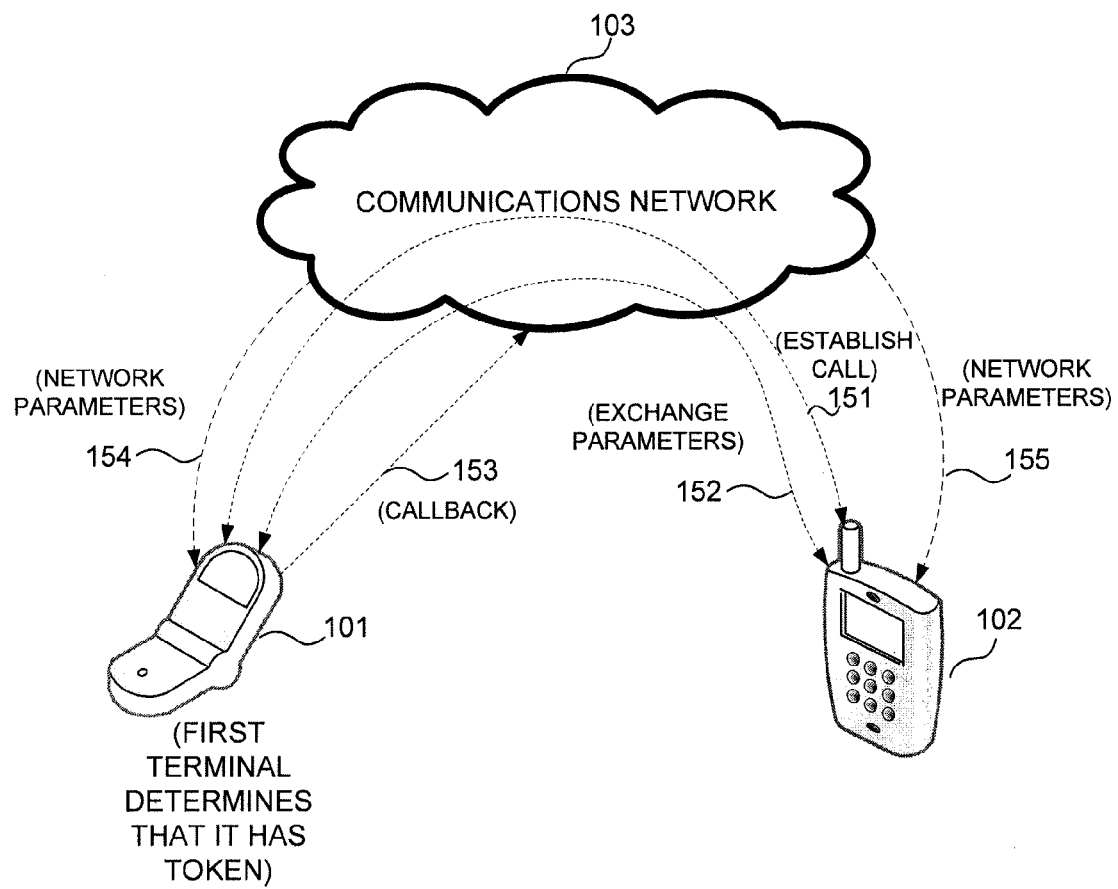
FIG. 1 shows a system that supports callback tokens in accordance with various aspects of the disclosure.

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention.

Transmission with the network and terminals may not be robust enough to maintain the call, thus causing the call to drop. For example, this may occur when a wireless terminal moves out of range of a wireless network. Also, an active call may not be maintained across a different provider's network (as calls cannot be re-routed over the traditional telephone network while in progress), resulting in termination of the call once a signal cannot be maintained between the terminal and the original network. Another common reason is when a terminal is taken into an area where wireless communication is unavailable, interrupted, interfered with, or jammed. From the network's perspective, this is the same as the mobile moving out of the coverage area. Calls may also be dropped upon handoff between cells within the same provider's network. This may be due to an imbalance of traffic within the areas of coverage for different cell sites (base stations). If the new cell site is operating at capacity, it typically cannot accept the additional traffic resulting by the call trying to hand into the cell. For example, a dropped call may occur if network configuration is not properly set up so that the serving cell site is not aware of the targeted cell site during the handoff of the terminal. If the wireless terminal cannot find an alternative cell to support the call, the call may be dropped.

Co-channel and adjacent channel interference may also be responsible for dropped calls in a wireless network. Neighboring cells (corresponding to base stations) operating on the same frequencies interfere with each other, deteriorating the quality of service and producing dropped calls. Transmission problems are also a common cause of dropped calls. Another problem may be a faulty transceiver located at the base station. Calls may also be dropped if a terminal at the other end of the call loses battery power and stops transmitting abruptly.

As will be further discussed, a communications system may automatically re-establish a dropped call or another data transmission. A terminal may publish, through the communications system or another communication channel, its parameters to other terminals in the call through in-band or out-of-band signaling, for example, prior to the call dropping. If the call drops, a terminal possessing a token may consequently initiate or facilitate a callback to the other terminals. As will be discussed, possession of the token may be determined from the terminal having the largest token value, where a token value may be obtained from the associated parameters of the terminal.

A dropped call or another data transmission may refer to a communication link that is prematurely disconnected between users. For example, a dropped call may occur when the radio link between a wireless terminal and serving cell site (base station) fails ("broken"). Dropped calls may occur for different reasons, including, for example, the terrain of the coverage area, equipment problems, atmospheric interference, and traveling outside the coverage area. In general, a dropped call occurs when the call is terminated by other than the calling user or the called user.

Typically when a dropped call or another data transmission occurs, the parties in the call may attempt to call each other back, resulting in the call not completing and, for example, each going to voice mail. For example, one user (person) may wait for the other user to call back after initially going to voicemail. Consequently, users may get stuck in voicemail or do not call each other back for an amount of time (e.g., a half a minute) expecting the other user to call them back.

Figure 2:
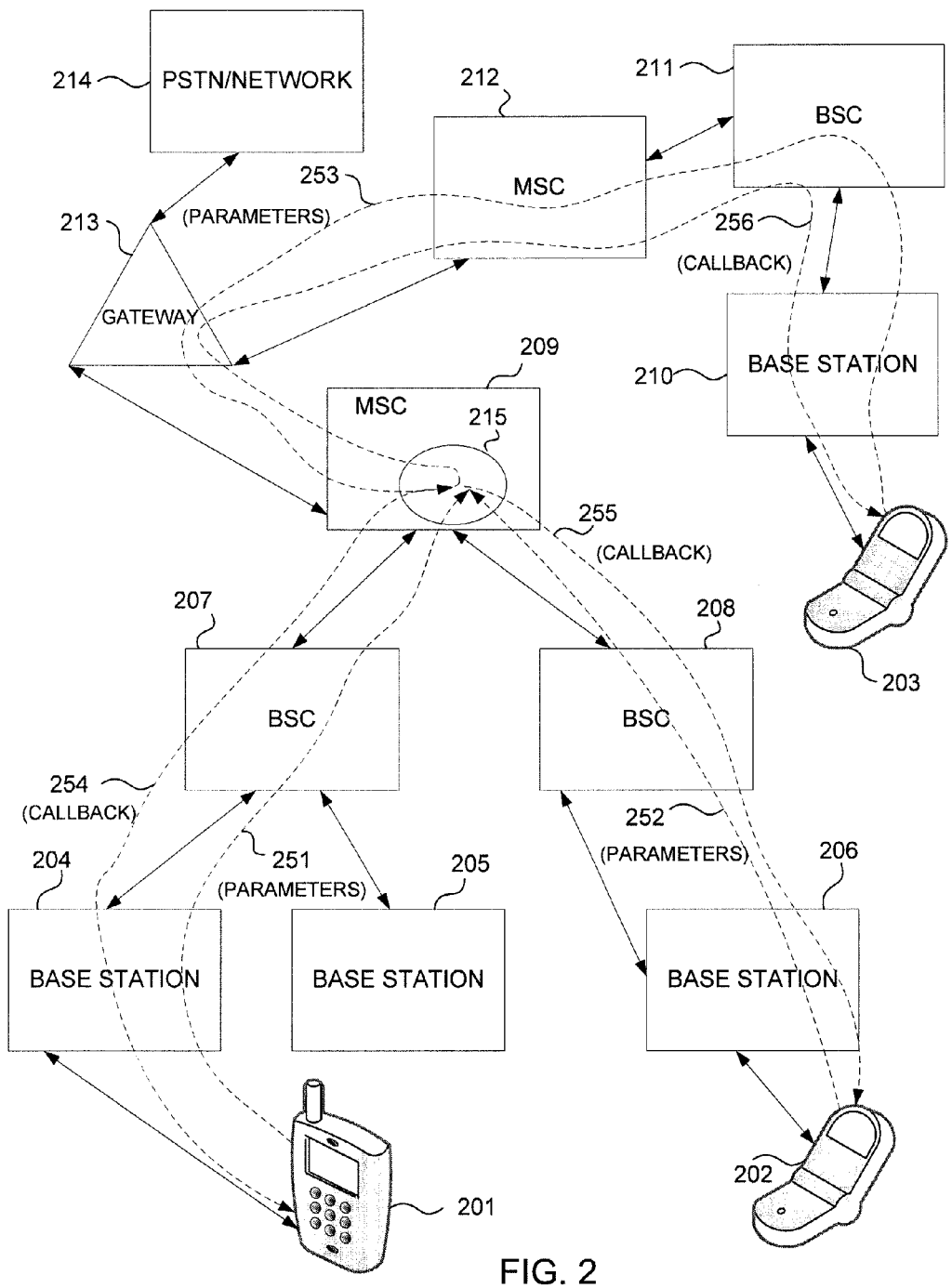
FIG. 2 shows a system for re-establishing a dropped call in accordance with various aspects of the disclosure.
Figure 3:
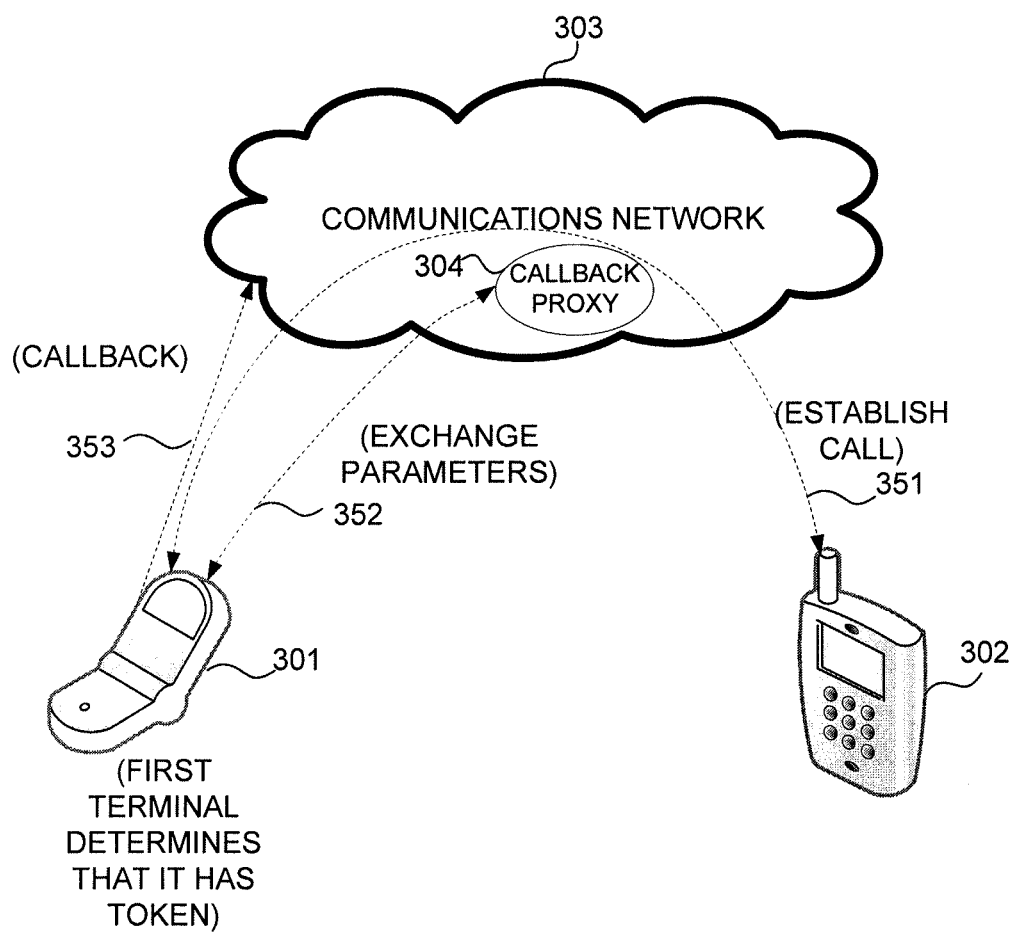
FIG. 3 shows a system that supports a proxy for legacy terminals in accordance with various aspects of the disclosure.

As will be discussed, FIGS. 1, 2, and 3 show three different examples of embodiments re-establishing a dropped call or another data transmission in accordance with various features of the disclosure. FIG. 1 depicts a terminal-specific approach, in which the terminals are feature-capable so that each terminal, for example, is able to determine which of the terminals possess a token. The terminal possessing the token may re-initiate the call if the call drops. FIG. 2 depicts a network approach, in which the network executes feature processing. This approach minimizes the impact on the terminals in order to support the feature. FIG. 3 depicts a hybrid approach where processing may be performed at both the network as well as at some or all of the terminals. For example, some of the terminals may be legacy terminals, and consequently do not support the feature. In such a case, the network may serve as a proxy for the legacy terminals while the feature-capable terminals determine token values and interact with the proxy rather than the legacy terminals themselves.

FIG. 1 shows a system that supports callback tokens in accordance with various aspects of the disclosure. In some instances, a call may be dropped upon handoff between cells within the same provider's network or between cells of different networks. With some embodiments, this event may be detected and used as a reason to have the other user maintain the callback token. When the first user is surrounded by cell networks that are at or near capacity (or even a percentage of the neighboring cells are) the first user may alert the other user via updating the token.

Figure 6:
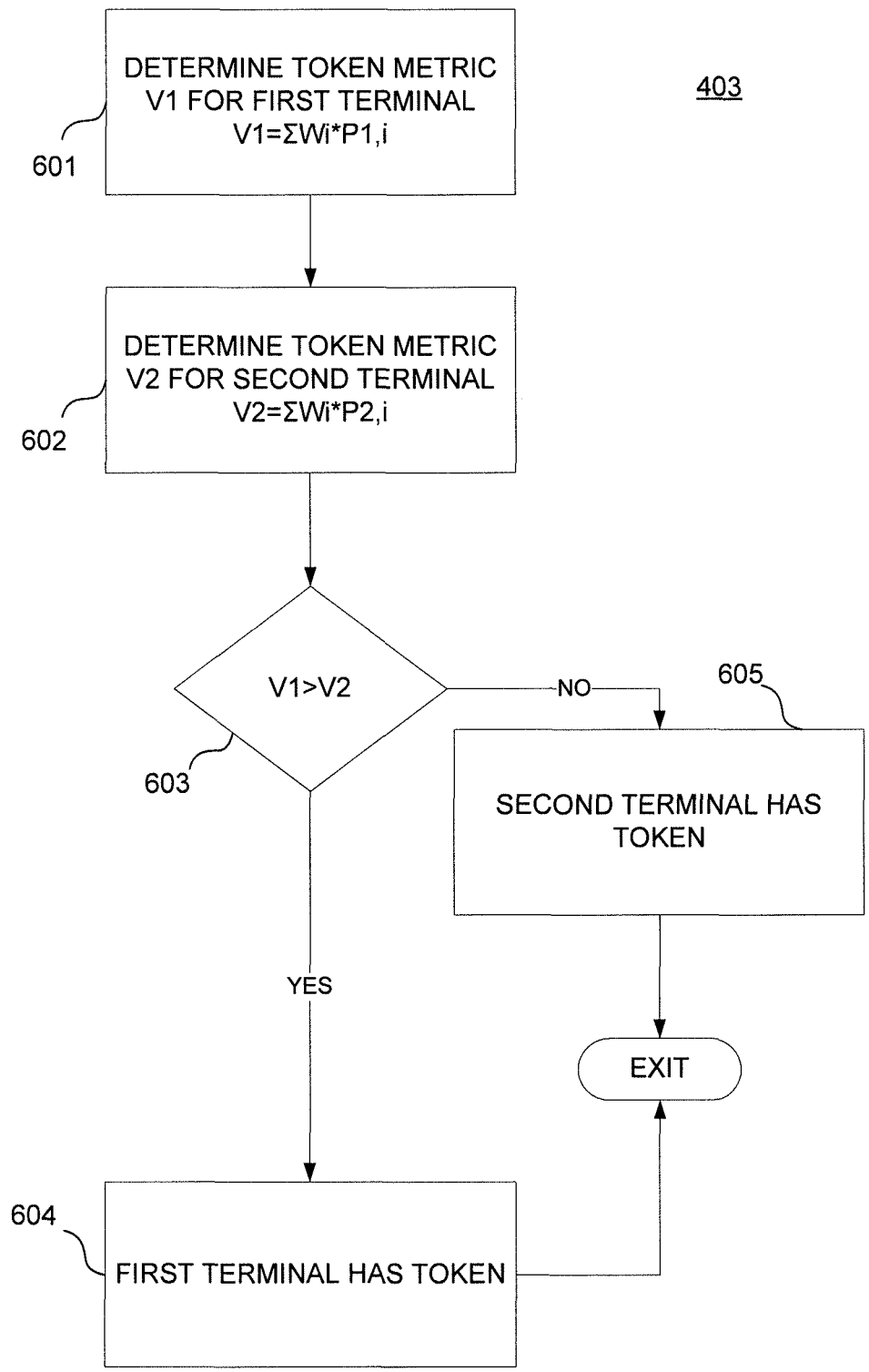
FIG. 6 shows a flow chart for determining which terminal possesses a callback token in accordance with various aspects of the disclosure.

As shown in FIG. 1, a call, for example, is established at event 151 between terminals 101 and 102 through communications network 103. If terminals 101 and 102 detect that the call has dropped, each terminal compares the token value for itself as well as the other terminals. The token value for a terminal may be determined from the parameters associated with the terminal. For example, as will be discussed, the token value may be obtained from a weighted sum of a subset of parameters. Possession of a callback token may be determined from the terminal having the largest token value. (An embodiment of the process is shown in FIG. 6 as will be further discussed.) Consequently, during the call or even during call setup, each terminal (user) on the call can designate the terminal holding the callback token. In the event a call is dropped (e.g., not hung up in a manual way), the terminal that holds the callback token may (based on user settings, for example) automatically re-initiate the call to other terminals at event 153. Embodiments may support calls with two or more terminals, where each terminal corresponds to a user.

In an embodiment, a terminal (e.g., terminal 101 or 102) may determine the token values for itself as well as for other terminals participating in the call based on published parameters exchanged at event 152 and a known relationship between token possession and the token values. For example, as will be discussed, a weighted sum may be used, in which each of the exchanged parameters are associated with a corresponding weight (which may be zero). Terminals 101 and 102 may exchange parameters in different ways. For example, terminal 101 may send a message (e.g., a short message service (SMS) message) to terminal 102 transparently through communications network 103 without a direct association with the established call. In such a case, communications network 103 need not perform any special processing to support the feature, and consequently, this approach may be referred as terminal-specific.

As a result of determining the token values of all participating terminals by each terminal, terminals 101 and 102 may agree who should re-initiate the call if the call drops. Because the terminal with the token may be designated to automatically re-initiate the call (corresponding to callback 153), the need for a user to manually call back the other user may be circumvented.

Embodiments may support different types of terminals, including wireless terminals, data terminals, legacy telephones (e.g., plain old telephone service (POTS)), multimedia terminals, text telephones (TTY), and voice over IP (VoIP) telephones. With some embodiments, token information may be passed between terminals using data packets, for example, with VoIP telephones. With some embodiments, token information for one terminal may be determined by another terminal using a known metric (e.g., as expressed by EQ. 1 as will be discussed) so that token information need not be passed between terminals. With some embodiments, it may not be desirable that some device types (e.g., text telephones) to be called back because, for example, the initial caller is dialing out through a company switch and does not have a direct number, e.g., a TTY operator is translating typed text to a third user over a voice line. Some embodiments may ensure that the token value of the corresponding terminal is zero by setting the weights (multipliers) of the parameters to zero.

With some embodiments, communications network 103 may interact with terminals 101 and 102 in order to support the callback feature. While terminals 101 and 102 typically maintain the majority of parameters for determining the token values, network 103 may provide pertinent parameters that are maintained by network 103 by sending signaling messages (corresponding to network parameters messages 154 and 155) to terminals 101 and 102 during the call if network 103 determines that the terminals are feature-capable as indicated by terminal characteristics provisioned in a network database or indicated during call setup with communications network 103. For example, terminals 101 and 102 typically may not know about current traffic metrics for the serving base station, e.g., the call capacity of the serving base stations. In addition, terminals 101 and 102 may combine the published parameters with the network parameters to form a modified set of parameters when determining the token values.

With some embodiments, all of the exchanged parameters may be maintained by terminals 101 and 102, where only event 152 occurs during a call. Such an approach may be referred as being terminal-centric. However, with some embodiments, events 152, 154, and 155 may occur during a call. Such an approach may be referred as a hybrid approach, where some of the parameters are maintained by terminals 101 and 102 and some of the parameters are maintained by network 103.

FIG. 2 shows a system that re-establishes a dropped call or another data transmission in accordance with various aspects of the disclosure. In contrast to FIG. 1, the network performs some or all of the processing in order to reduce the impact on terminals 201-203. Hence, this approach may be referred as a network-centric approach.

The network comprises base stations (which may be referred as cell sites) 204-206 and 210, base station controllers (BSCs) 207, 208, and 211, mobile switching centers (MSCs) 209 and 212, gateway 213, and public switching telephone network (PSTN) and/or a network such as Internet 214.

Embodiments may support different terminals that span one or more wireless systems. For example, as shown in FIG. 2, terminals 201 and 202 are located in a wireless system supported by MSC 209 and terminal 203 is located in a wireless system supported by MSC 212. Each wireless system, in turn, may be interconnected through gateway 213, which may perform message translation to handle any system incompatibilities.

Callback feature processing, for example, is performed in the network in order to re-initiate a dropped call or another data transmission. For example, MSC 209 may host callback process 215 that collects terminal parameters from terminals 201-203 at events 251-253 (typically corresponding to signaling messages) and/or access network terminals associated with each of the terminals. If the call drops, callback process 215 conditionally re-establishes the call based on at least one of the parameters at events 254-256. For example, the callback could be conditioned on who the other user is. If the other user is someone who is important to the user (e.g., mom versus salesman), then the user probably would want to re-establish the call; otherwise, the call would not be established. Embodiments may consider other parameters when determining callback conditionality, including a maximum time of call, battery time of the terminal, interference level, ground speed of the terminal, and the like.

While FIG. 2 depicts process 215, for example, as residing within MSC 209, process 215 and other processes may reside in other network entities (e.g., BSC 207) or may be distributed over a plurality of network entities.

While FIG. 2 shows a wireless service for supporting a call to terminals 201-203, other types of terminals may be supported. For example, a call may be established to wireline terminals on a PSTN/Internet 214. Wireline terminals may assume different forms, including POTS and VoIP telephones.

FIG. 3 shows a system that supports proxy 304 for legacy terminal 302 in accordance with various aspects of the disclosure. Because some of the callback processing may be performed by network 303 and some of the callback processing may be performed at feature-capable terminal 301, the approach may be referred as a hybrid approach.

Because terminal 302 may not be feature-capable, callback proxy 304 represents terminal 302 during the interaction with terminal 301 for callback functions. In response to call establishment event 352, proxy 304 exchanges parameters with terminal 301. However, because network 303 may not have knowledge of all of the published parameters that would have been maintained at terminal 302 if terminal 302 were feature-capable, proxy 304 may send a subset of the published parameters. In such a case, terminal 302 and proxy 304 may adjust the token value relationship as will be further discussed.

Figure 4:
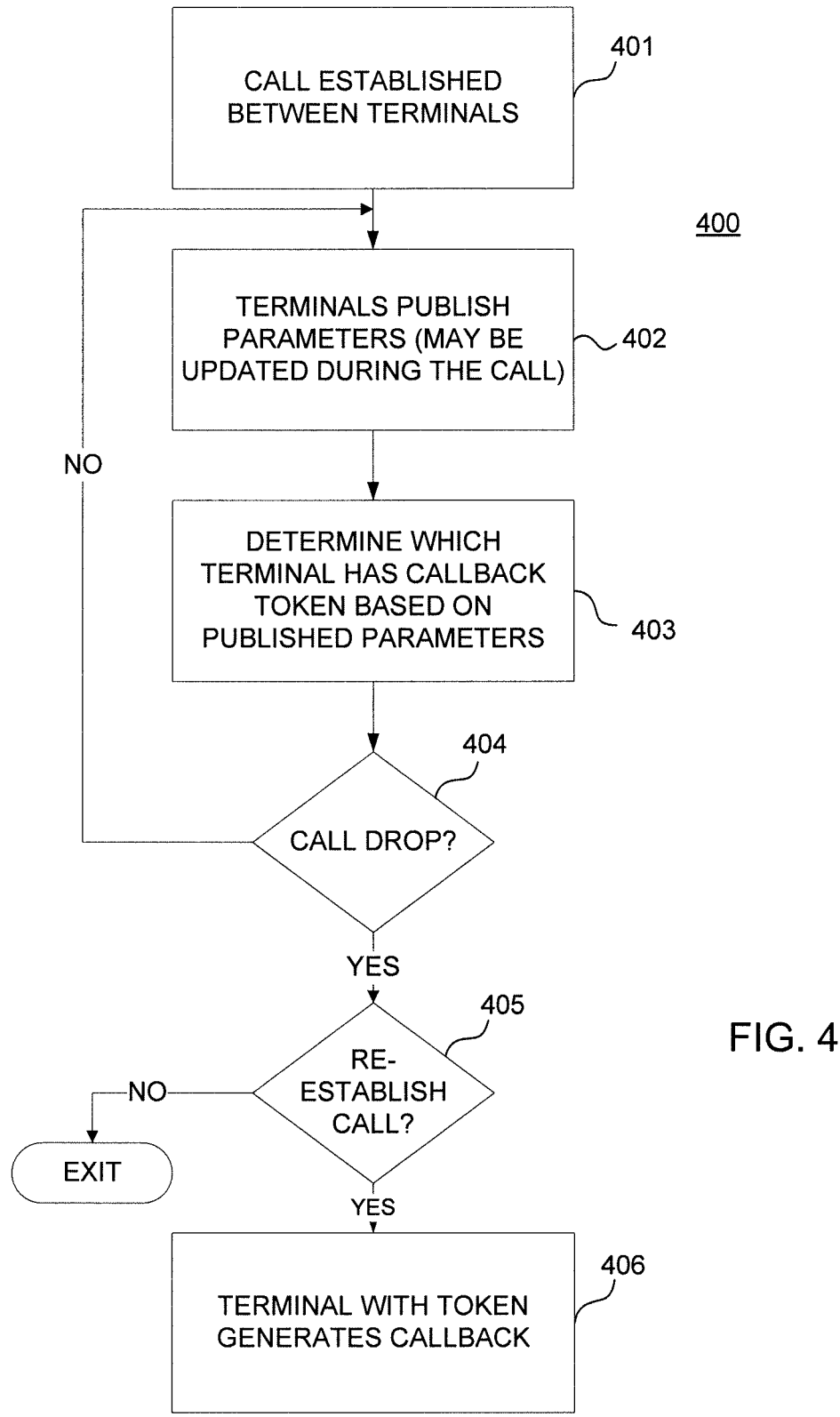
FIG. 4 shows a flow chart for re-establishing a dropped call in accordance with various aspects of the disclosure.

FIG. 4 shows a flow chart for process 400 that may be performed by a feature-capable terminal, e.g., terminal 101 as shown in FIG. 1, to re-establish a dropped call or another data transmission in accordance with various aspects of the disclosure.

At block 401, a call or other data transmission may be established with two or more feature-capable terminals. The terminals exchange parameters with each other by publishing parameters at block 402. For example, terminals may send one or more messages (e.g., SMS or multimedia messaging service (MMS) messages) that contain relevant parameters that are used when determining token values as will be discussed with FIG. 6. With some embodiments, network parameters may be provided by the network so that the additional parameters may be included when determining token values.

Examples of parameters that may be maintained at a feature-capable terminal and/or at the network include:

Where you are: A terminal may estimate its location based on the global positioning system (GPS) if a call were dropped due to a tunnel/dead zone, and cross reference its position and heading with known tunnels and/or dead zones. Once this is known, the other terminal (user) may try to re-establish the call once expecting to get a busy/cannot connect response. After this is done, the terminal may wait for the other terminal to call back once the terminal is out of the tunnel. With some embodiments, the network may initiate the callback, for example after the first busy failure, when the terminal (e.g., cell phone) that dropped comes back into the network.

Who called/calling timeframe: For example, if a salesman or unknown number calls and the call is disconnected (dropped), the called user would probably not want to re-establish the dropped call or another data transmission. With some embodiments, if a user were talking to his/her mom or saved contact (for which the user may set priorities of how much the users wants to call each back), the user would probably want the call re-established. Also, the determination of whether to initiate a callback may be based on the call log of the terminal. For example, if the user called the other user multiple times in the past two weeks, it may be quite possible that the other user is important to the user so that a callback should be initiated to the other user. With some embodiments, the user may configure the priorities through a user interface of the feature-capable terminal.

Average call duration: The terminal may determine how long an average call is. The average call duration may be dependent on a specific user, where the terminal tracks the call duration per contact. The user typically may want to re-establish the call if the average calling timeframe was not met.

Number of clients on the same cell tower: This parameter may be maintained at the network. The parameter may be used to ascertain that when attempting to re-establish the call, the terminal holding the token is not limited by the currently serving cell tower (base station). By prioritizing the terminal on the cell tower with bandwidth/calls available, the call may be more likely to be re-established.

Modulation/bitrate: This parameter may be linked with the number of clients on the same cell tower. If two towers (base stations) have the same available bitrate but one is running at a higher modulation, then it may be able to fit more calls into the same available space.

The above two parameters (number of clients on the same cell tower and modulation/bitrate) may enable a terminal or network to calculate the maximum number of clients (terminals) that may be supported and the current number of clients in use.

Latency to the back office: This parameter may be indicative of how long it takes to re-establish a call. By each terminal knowing this information, the terminal may predict how quickly the terminal should expect a re-establishment attempt. If an attempt is not received within this timeframe, the terminal may initiate an attempt of its own.

Encryption enabled/type of encryption: A user may prefer encryption if re-establishment attempts occur.

Number of alternative communication options: Terminals may have different communications options such as third generation (3G), fourth generation (4G), and code division multiple access (CDMA). Some terminals may allow calls to be routed over other modulation types, other carriers, or other interfaces such as WiFi and Bluetooth. By having more options, the terminals may be more likely to re-establish the dropped call or another data transmission.

Terminals on same account: If one terminal cannot be reached, another terminal on the same account may be tried instead (e.g., business phone versus personal phone)

Current phone plan: The user that may be on a minute/minute plan (e.g., allowing free reception of calls) may not want to attempt calls or be the one initiating the connection if the other user has an unlimited plan. Consequently, who gets the callback token may be based on particular calling plans (e.g., who can call out for free and who can receive calls for free).

Battery life: Knowing this parameter may enable the terminal with the best battery life to attempt the re-establishment calls and enables the other terminal to know if it should not attempt a callback (or not more than a few times) if the other terminal's battery is very low prior to dropping off the call (for example, the other's terminal's battery may have died). In general, the greater the battery life of the terminal, the longer the total talk time when the call is re-established.

Amount of interference detected: In general, more interference may cause longer re-establishment calls to complete.

Signal strength at time of dropped call: The terminal measuring the greatest signal strength at the time of the dropped call typically has the best chance of initiating the re-establishment of the call.

Ground speed previous to being cut off (or accelerometer statistic): For example, if one of the users is on an air flight and does not shut off his/her terminal, the terminal may stop working a few hundred feet off the ground. Similarly, one may be in an elevator before the call drops or traveling at a high rate in a train or car as indicated by an accelerometer in the terminal and/or GPS measurement. In cases, the re-establishment of the call may not be attempted.

Based on some of the parameters published by a terminal at block 402 or received from other terminals at block 403, the terminal may be able to determine token values for itself as well as for the other terminals as will be further discussed in FIG. 6.

If the terminal determines that the call has dropped at block 404, the terminal determines whether the call should be re-established at block 405. One or more of the above parameters may be used to determine whether to re-establish the dropped call or another data transmission, e.g., who is on the call.

Based on a metric (e.g., EQ. 1 as will be discussed below) known at each terminal, the token values for itself as well as the other terminals may be determined as shown in FIG. 6. The terminal having the highest token value then initiates the callback at block 406.

As previously discussed, embodiments may support different types of terminals, including wireless and wireline terminals. The determination of which feature-capable terminal should initiate callback may be based on the type of terminal. For example, a wireline terminal typically has a faster setup time than wireless terminal. Consequently, if one user of a call has wireline service and the other user has wireless service, the wireline terminal may possess the callback token. Bandwidth consideration may also be considered.

Figure 5:
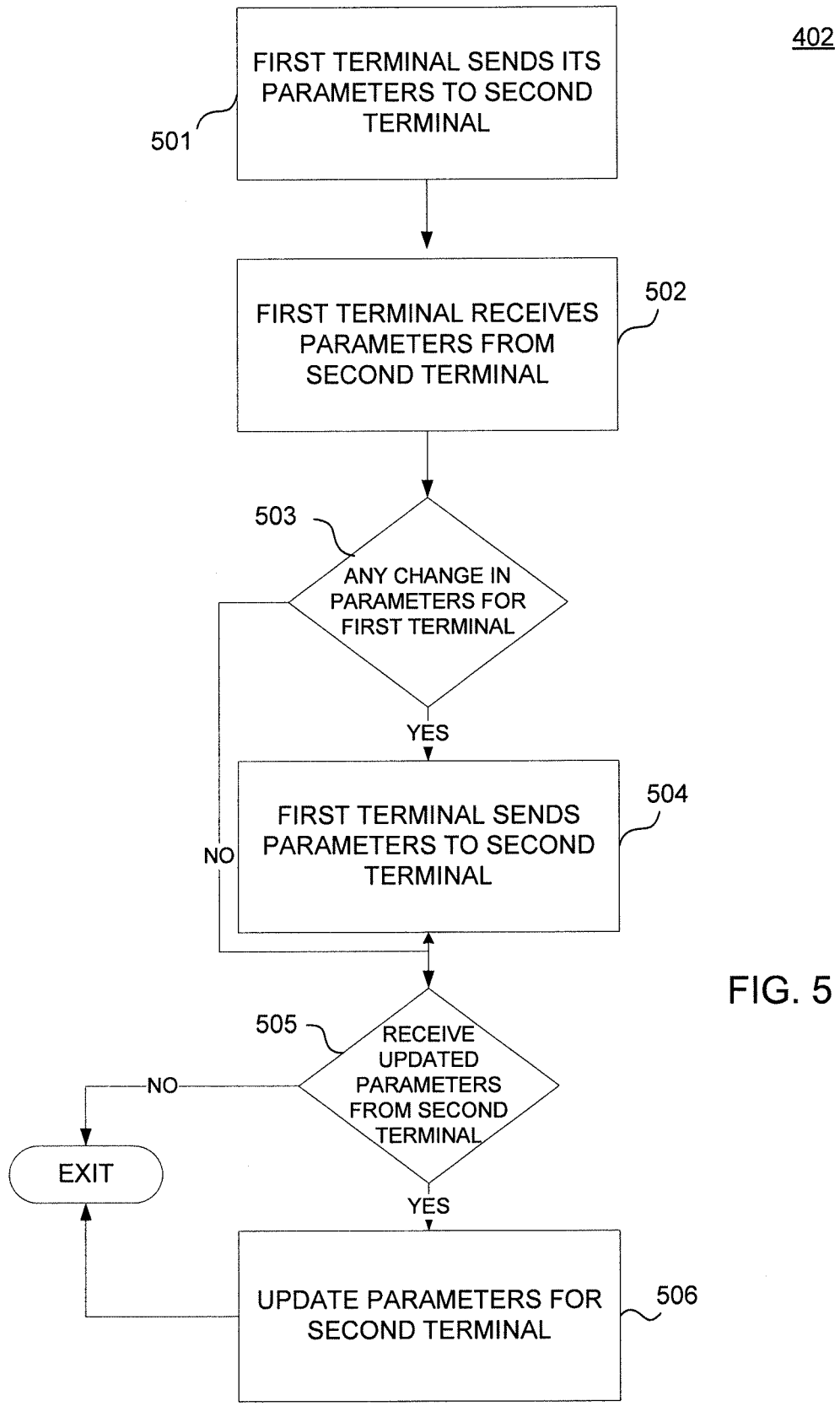
FIG. 5 shows a flow chart for exchanging parameters between terminals in accordance with various aspects of the disclosure.

FIG. 5 shows an exemplary flow chart 402 (corresponding to block 402 in FIG. 4) for a process to exchange parameters between two terminals in accordance with various aspects of the disclosure. However, embodiments may support calls with more than two terminals.

At block 501 a first terminal sends its parameters to the second terminal, for example, at the beginning of the call. The parameters may be in-band e.g., sent over the call connection) or out-of-band (e.g., separately from the call through text messaging for example). Similarly, the first terminal receives parameters from the second terminal at block 502.

If any of the parameters (e.g., battery life) of the first terminal changes during the call (block 503), the first terminal sends the updated parameters to the second terminal at block 504. Similarly, if any of the parameters changes at the second terminal (block 505), the first terminal receives updated parameters at block 506.

FIG. 6 shows flow chart 600 for an example process to determine which terminal possesses a callback token in accordance with various aspects of the disclosure. At block 601, the token value (V1) of the terminal is determined by a weighted sum of the parameters, where some of the weights may be zero so that the corresponding parameters are not considered in the determination. For example, the corresponding metric is given by the following:

$$\text{Token\_Value} = \rho W_i * P_i \quad \text{EQ. 1}$$

where $P_i$ is the $i^{th}$ parameter (either published parameter or network parameter) and $W_i$ is the associated weight.

At block 602, the token value (V2) of the other terminal may be determined by the terminal using the same metric as shown in EQ. 1. With some embodiments, only a ratio of token values (e.g., V1/V2) may be transmitted so that all of the parameters do not have to be exchanged with each client. However, with some embodiments if separate token values are exchanged, then each client may be able to weigh parameters differently and helps a proxy (e.g., network proxy 304 as shown in FIG. 3) to send individual metrics because some metrics may not be used by legacy terminals using the network proxy.

With some embodiments, the terminal having the largest token value possesses the token as determined at blocks 603-605. In addition, with some embodiments, the determined token value must be greater than a predetermined threshold in order for the terminal to possess the token. In such cases, if none of the token values is greater than the predetermined threshold, then none of the terminals possesses the token and consequently the callback may not be initiated.

Figure 7:
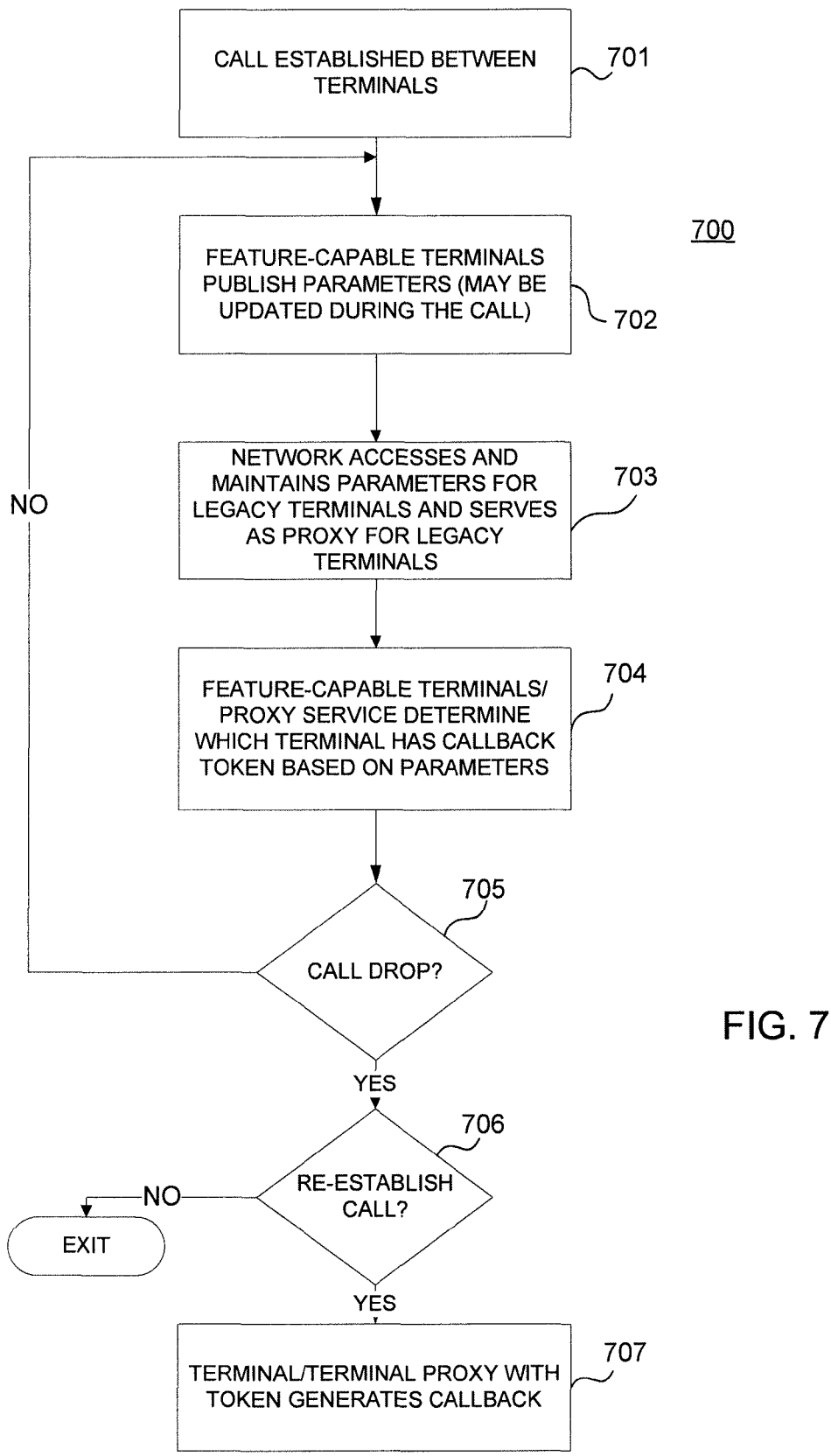
FIG. 7 shows a flow chart for re-establishing a dropped call in accordance with various aspects of the disclosure.

FIG. 7 shows flow chart 700 for a process for re-establishing a dropped call or another data transmission in accordance with various aspects of the disclosure. As previously discussed (as referred as a hybrid approach), some terminal terminals (referred as legacy terminals) may not support the callback feature. In such cases, the network may provide a proxy service (e.g., proxy 304 as shown in FIG. 3), where the proxy service represents the legacy terminal when interacting with the feature-capable terminals. For example, the proxy service may provide parameters for the legacy terminal to the other terminals (i.e., feature-capable terminals) and determines the token values for the legacy terminal. If the legacy terminal has the largest token value, then the proxy service initiates the callback on behalf of the legacy terminal. However, the proxy service may not know all of the parameters corresponding to the parameters published by the feature-capable terminals. In such cases, the metric may be adjusted so that the available parameters are used. For example, a metric adjustment indicator may be inserted when communicating with the proxy service and the feature-capable terminals to indicate so.

However, with some embodiments, the determination of token possession may be restricted only to feature-capable terminals. For example, if only one terminal is feature-capable, only that terminal possesses the token if the call drops.

Referring to FIG. 7, a call may be established between a feature-capable terminal and a legacy terminal at block 701. The feature-capable terminal publishes its parameters to the proxy service at block 702 while the proxy service publishes the parameters for the legacy terminal based on accessed network parameters at block 703.

The feature capable terminal and proxy service determines the token values in accordance with a token metric (e.g., EQ. 1) at block 704. If the call drops and if the call should be re-established as determined at blocks 705 and 706, the entity having the token initiates the callback. For example, if the feature-capable terminal possesses the token, then the feature-capable terminal initiates the callback at block 707. If the legacy terminal possesses the token, then the proxy service initiates the callback on behalf of the legacy terminal.

Figure 8:
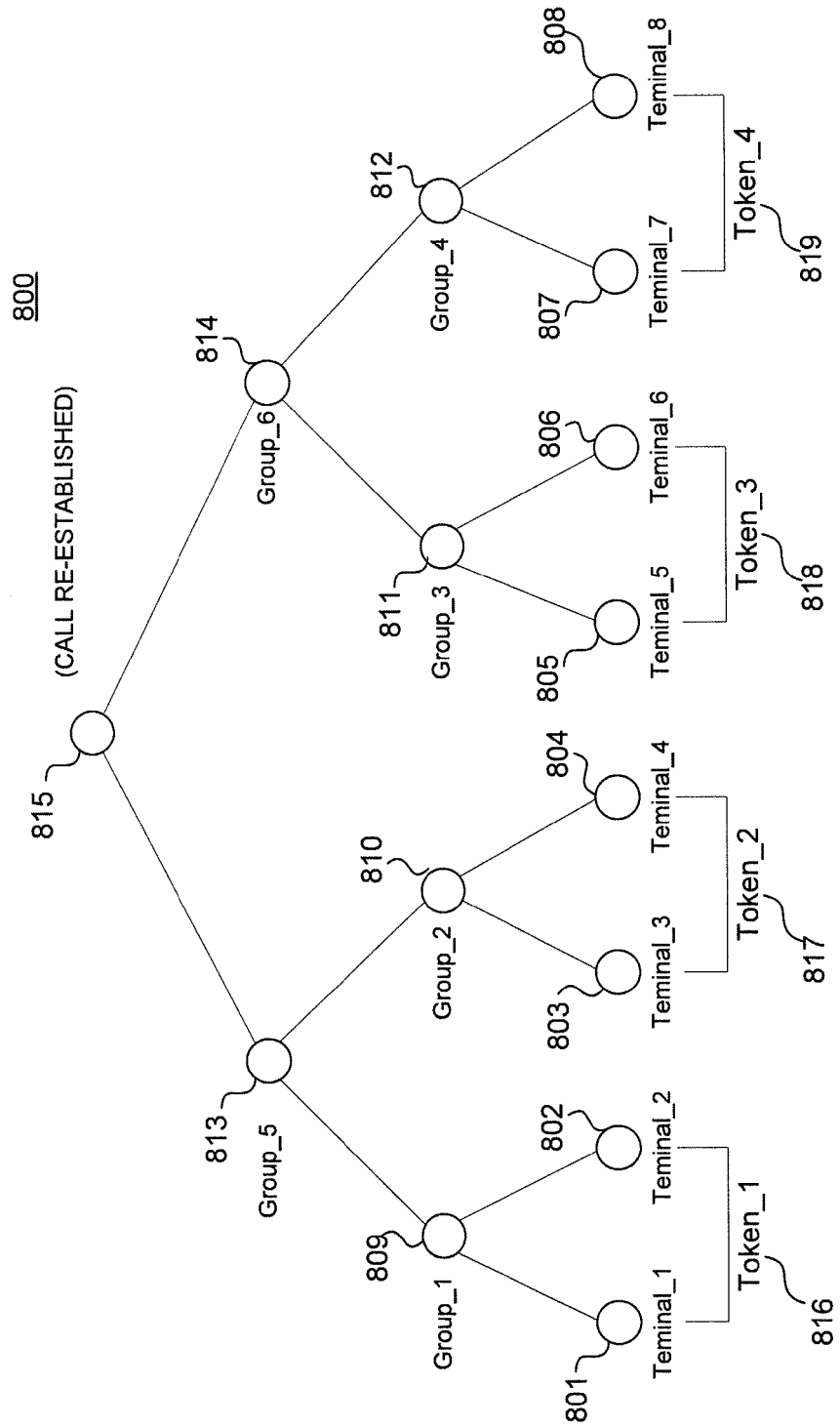
FIG. 8 shows a callback configuration in which a dropped call is re-established using a plurality of callback tokens in accordance with various aspects of the disclosure.

FIG. 8 shows callback configuration 800 in which a dropped call or another data transmission is re-established using a plurality of callback tokens in accordance with various aspects of the disclosure. While a call may involve more than two terminals, one token may be used to re-establish the dropped call. However, some embodiments may use more than one token.

When a call includes more than two terminals (e.g., a large conference call), it may be advantageous to use two or more tokens to expedite re-established the call by partitioning the involved terminals into a plurality of groups. For example, with N terminal, rather than having one terminal initiating callback to the N−1 other terminals, the call may re-established by combining a larger and larger number of terminals similar to a pyramiding structure.

Referring to FIG. 8, tokens 816-819 are created for each of groups 809-812, respectively. Terminals 801-802, 803-804, 805-806, and 807-808 are assigned to groups 809-812, respectively, where the terminal in each group having the largest token value possesses that corresponding token if the call drops. Consequently, only the terminals within each group exchange parameters with each other. The terminal possessing the token initiates a callback to the other terminals in the group. In this particular configuration, there is only one other terminal in the group. Subsequently larger groups are formed, e.g., groups 809 and 810 are combined into group 813 and groups 811 and 812 are combined into group 814. Subsequently, groups 811 and 812 are combined into group 815, which includes all of the terminals, thus re-establishing the dropped call or another data transmission.

Referring to FIG. 8, some embodiments may support more than four tokens. For example, tokens 5, 6, and 7 may span terminals 801-804, terminals 805-808, and all terminals, respectively. When a terminal is dropped, it is typically unlikely that the dropped terminal could have the highest level token (token 7) so it waits for a call back. Assuming the call is still continuing, another terminal (user) may determine that someone dropped off, realize that it has the token for that level, and reestablish the call. If the terminal that is dropped does have the token, the dropped terminal may attempt to call back each user, and once connected the dropped terminal may be rejoined to the call already in progress.

According to one aspect, tokens are created so that every user can be reached by one or more of the tokens in the token chain. For example, token 1 spans terminals 801-803, token 2 spans terminals 803-805, and token 3 spans terminals 804-808. Consequently, any terminal may be reached by following a token path from another terminal.

With the example shown for configuration 800, N/2 tokens are generated for N terminals. However, some embodiments may use a different number of tokens. For example, the number of tokens may be N−1 as previously discussed.

Figure 9:
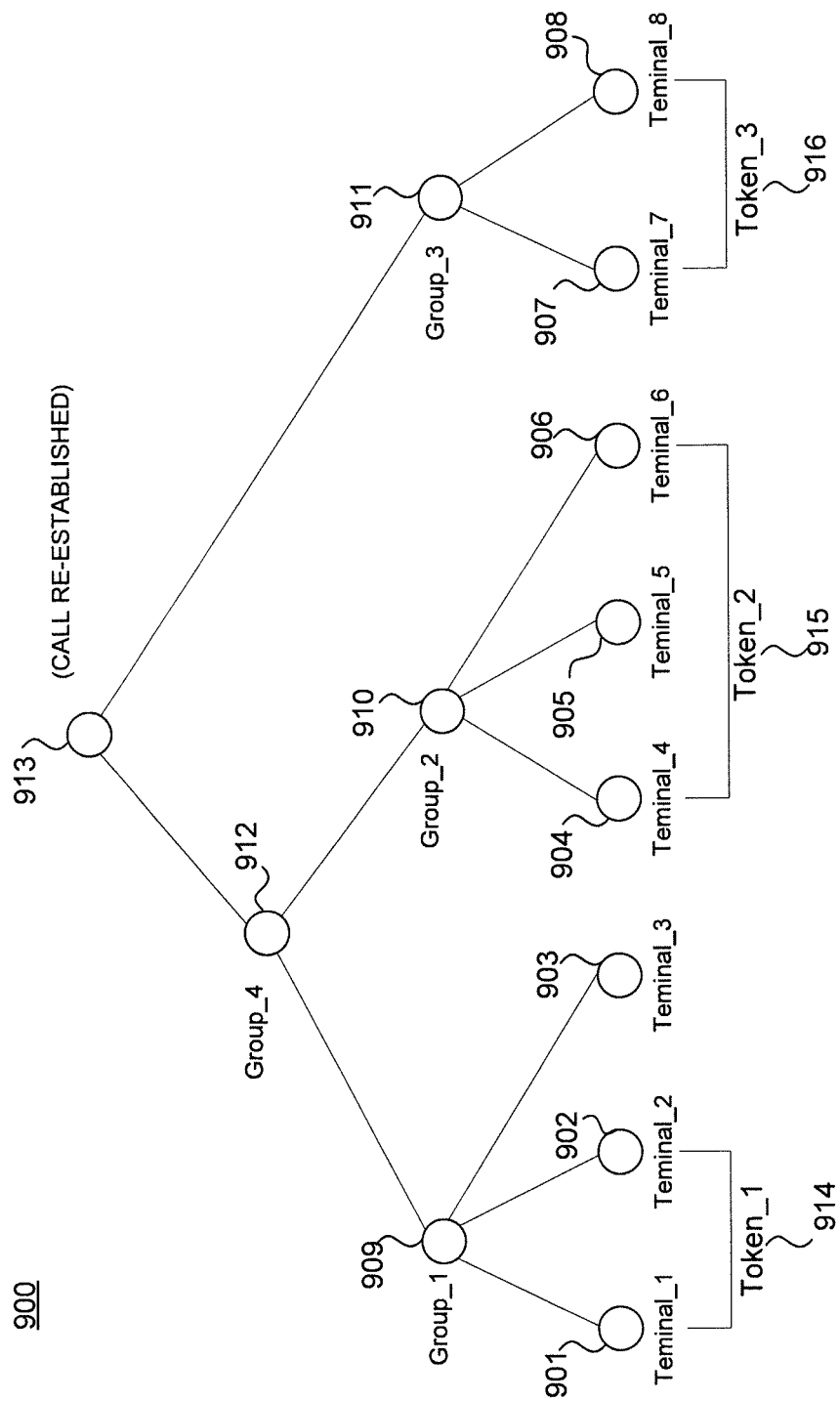
FIG. 9 shows a callback configuration in which a dropped call is re-established using a plurality of callback tokens in accordance with various aspects of the disclosure.

FIG. 9 shows callback configuration 900 in which a dropped call or another data transmission may be re-established using a plurality of callback tokens in accordance with various aspects of the disclosure. In contrast to configuration 800, configuration 900 partitions terminals 901-908 into groups with varying numbers of terminals that need not be a power of two. Tokens 914-916 are assigned to groups 909-911, respectively. Groups 909 and 910 are combined into group 912, which are in turn, is combined into group 911 to form group 913, resulting in the call being re-established.

Figure 10:
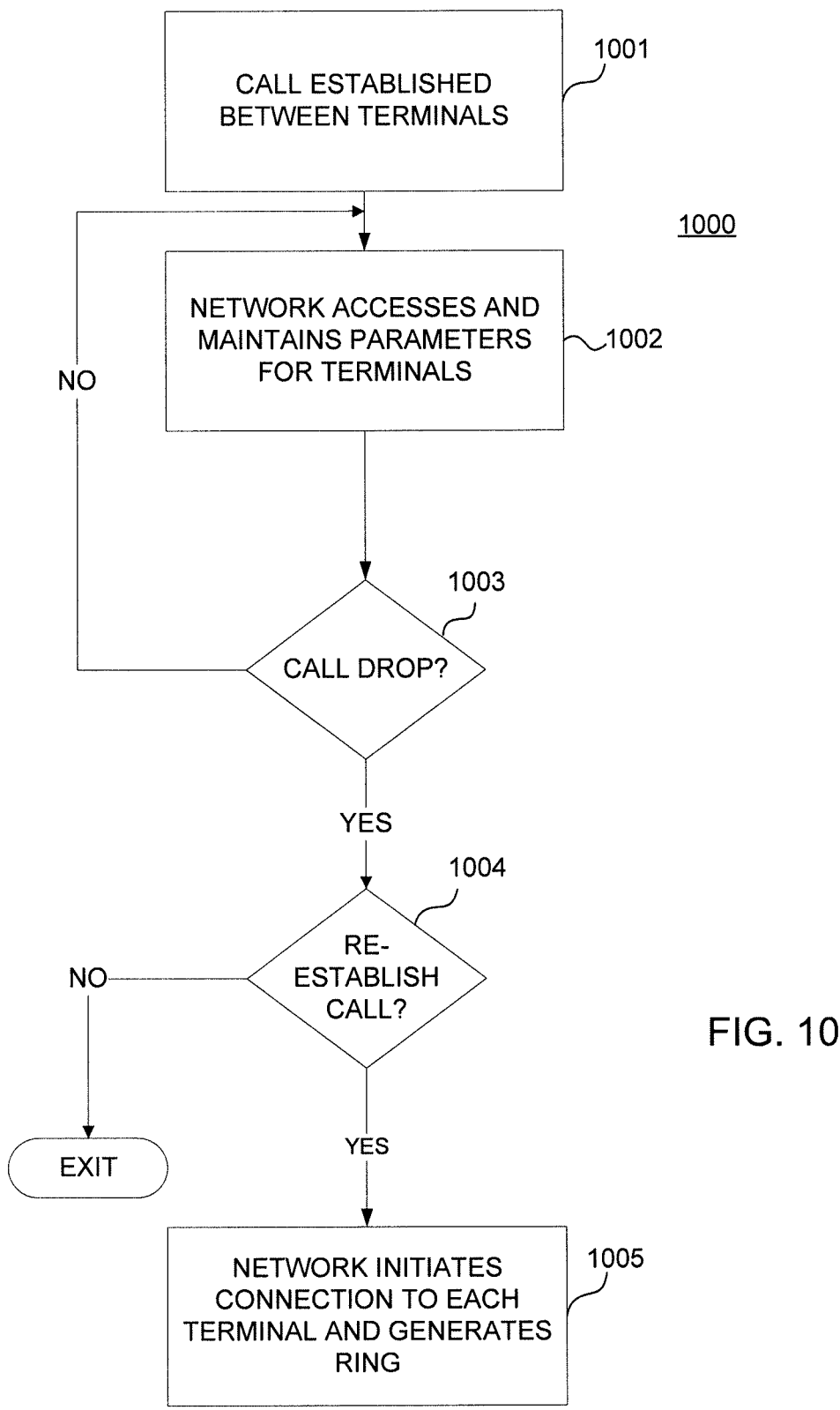
FIG. 10 shows a flow chart for re-establishing a dropped call in accordance with various aspects of the disclosure.

FIG. 10 shows flow chart 1000 for a process to re-establish a dropped call or another data transmission in accordance with various aspects of the disclosure. In contrast to flow chart 400, processing for the feature ma y be per formed by the network (e.g., BSCs 207-208 and MSC 209) rather than at the terminals, corresponding to a network-centric approach. Consequently, the implementation of terminals is not affected in order to support the callback feature.

Because FIG. 10 is based on a network-centric approach, tokens are not typically used between users in the call. However with some embodiments one or more tokens may be used internally by a network proxy to designate which user to call back first (for example, in the case where all users couldn't be called at the same time).

At block 1001, a call may be established between terminals. Parameters associated with the terminals are accessed within the network at block 1002. However, there may not be corresponding parameters corresponding to some of the published parameters that may be supported by a terminal-centric approach because the parameters are maintained by the network.

If the network determines that the call has dropped at block 1003, the network determines whether the call should be re-established at block 1004 based on the parameters accessed at block 1002. For example, signal levels of the terminals measured at the serving base stations may be too low for a desired degree of service quality, and consequently the call may not be re-established. If, however, the call should be re-established, the network initiates connection to each terminal and generates an alert (ringing) at block 1005.

Figure 11:
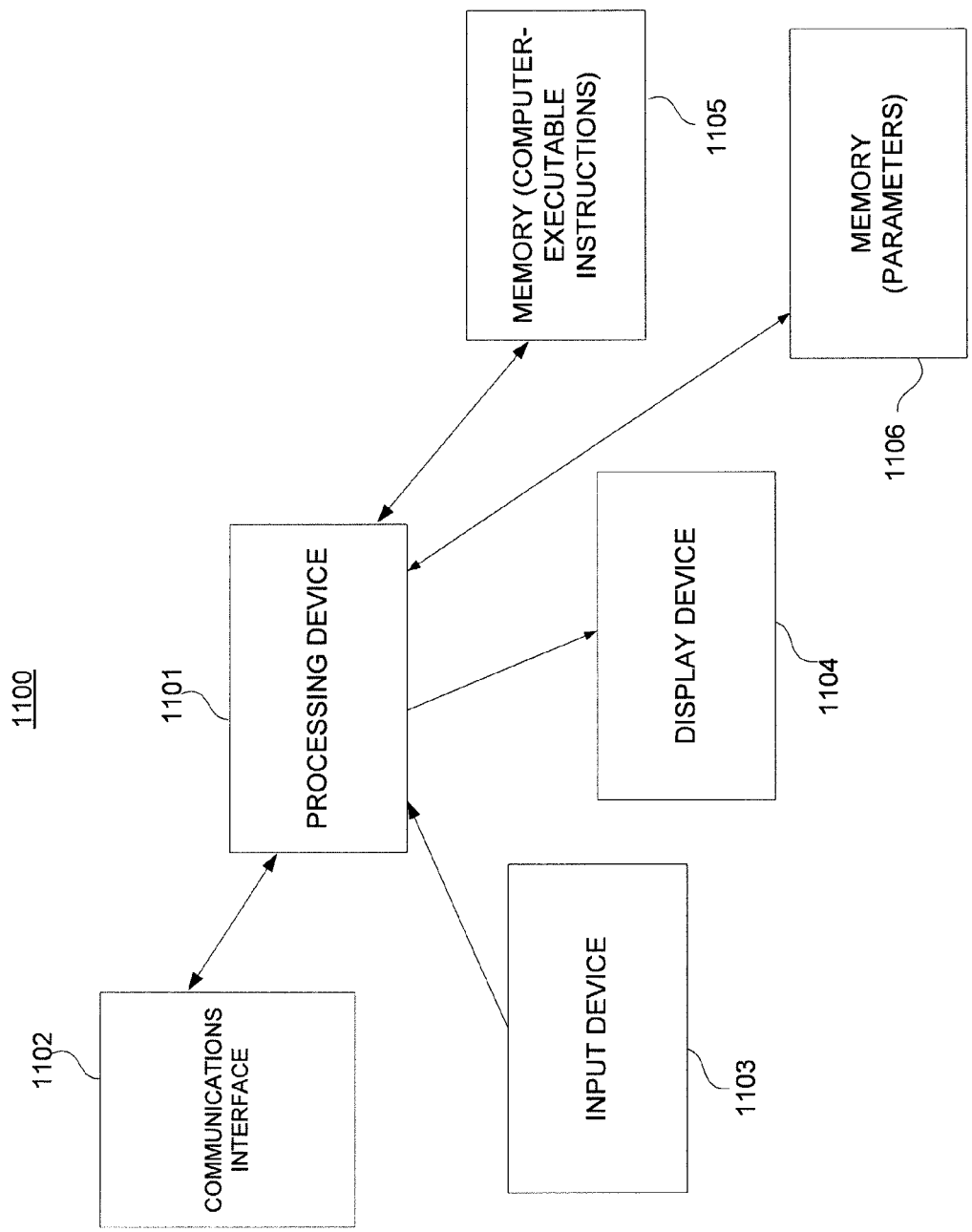
FIG. 11 shows an apparatus that supports callback capability in accordance with various aspects of the disclosure.

FIG. 11 shows an apparatus (e.g., a wireless terminal) that supports callback capability in accordance with various aspects of the disclosure. With some embodiments, apparatus 1100 supports the processes shown in flow charts 400, 402, 403, 700, and 1000 as shown in FIGS. 4-7 and 10, respectively. Processing device 1101 may execute computer executable instructions from a computer-readable medium, e.g., memory 1105 in order to perform a decryption process. Computer storage media may include volatile and nonvolatile, removable and non-removable media implemented in any method or technology for storage of information such as computer readable instructions, data structures, program modules or other data. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by processing device 1101. The executable instructions may carry out any or all of the method steps described herein. With some embodiments, processing device 1101 may comprise one or more processing devices.

Apparatus 1100 communicates to a communications system through communications interface 1102 over a communications channel (e.g., a radio channel) in order to support a call. For example, apparatus may initiate the call through input device 1103 to another apparatus (not explicitly) and may exchange parameters with the other apparatus as previously discussed. The published parameters of apparatus 1100 and other apparatus may be stored in memory, e.g., memory 1106.

If processing device 1101 determines that the call drops, processing device 1101 determines the token value of apparatus 1100 and the other apparatus using the published parameters stored in memory 1106. If the token value of apparatus 1100 is greater than the token value of the other apparatus, then apparatus 1100 may automatically re-initiate the call by calling back the other apparatus. Otherwise, apparatus 1100 may wait for the other apparatus to call back.

Apparatus 1100 may also display the status of the callback feature on display device 1104. For example, when the call drops and apparatus 1100 is handling the callback, apparatus 1100 may indicate so on display device 1104. However, if apparatus 1100 is unsuccessful in automatically re-establishing the call, apparatus 1100 may indicate that the user should manually attempt to re-establish the call.

Figure 12:
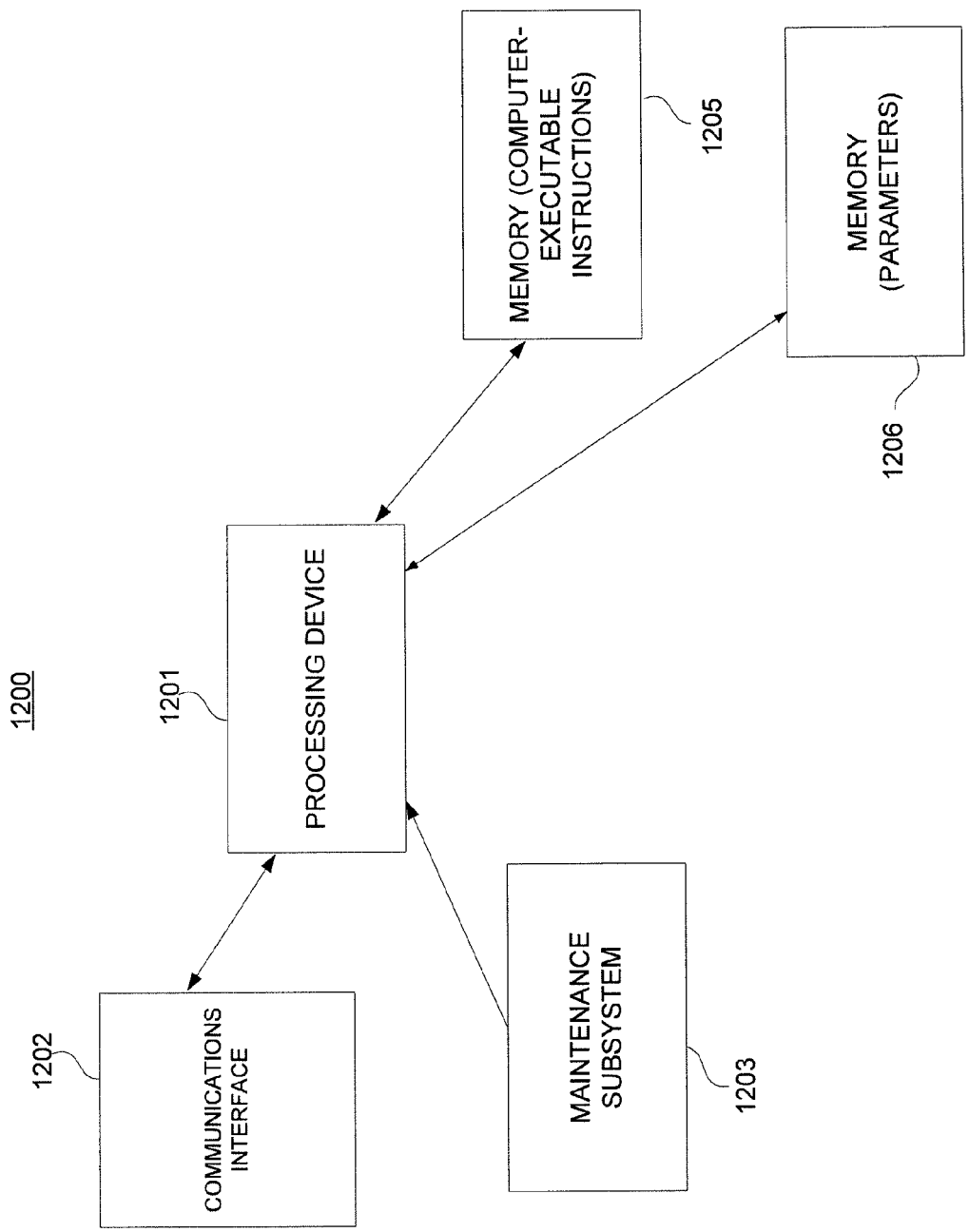
FIG. 12 shows an apparatus that supports callback capability in accordance with various aspects of the disclosure.

FIG. 12 shows an apparatus (e.g., communications network 103 and 303 as shown in FIGS. 1 and 3, respectively) that supports callback capability in accordance with various aspects of the disclosure. With some embodiments, apparatus 1200 may support the processes shown in flow charts 400, 402, 403, 700, 1000 as shown in FIGS. 4-7 and 10, respectively. For example, apparatus 1200 communicates to a communications system through communications interface 1202 over a communications channel (e.g., a radio channel) in order to support a call for a terminal as previously discussed. Processing device 1201, for example, may execute computer executable instructions from computer-readable medium, e.g., memory 1205 in order to support communications between terminals. The executable instructions may carry out any or all of the method steps described herein. With some embodiments, processing device 1201 may comprise one or more processing devices that may be distributed over different network entities (e.g., base station 204, BSC 207, and MSC 209 as shown in FIG. 2).

Processing device 1201 may also maintain callback-related parameters in memory device 1206 when supporting the callback feature for network-centric and hybrid approaches as previously discussed.

An operator may configure a communications network through maintenance subsystem 1203. For example, handoff parameters for base stations 204-206 may be entered or updated through subsystem 1203 in order to supports calls between terminals. Also, for example, an operator may configure specific terminals with the callback feature as previously discussed.

While the exemplary embodiments have been discussed, the disclosure may be configured for other devices, implementations, and/or networking environments.

I claim:

1. A method, comprising:
   establishing a call with a second terminal;
   publishing, at a first terminal, a first set of parameters comprising first terminal characterizations;
   receiving, at the first terminal, a second set of parameters comprising second terminal characterizations;
   calculating, at the first terminal, a first token value based at least in part on a weighted sum of the first set of parameters and a second token value based at least in part on a weighted sum of the second set of parameters;
   determining, at the first terminal, that first token value is greater than the second token value;
   determining, at the first terminal, that the call has dropped; and
   re-establishing, at the first terminal, the call.

2. The method of claim 1 further comprising:
   determining, at the first terminal, whether the dropped call should be re-established.

3. The method of claim 1, further comprising:
   including a third terminal in the call;
   receiving, at the first terminal, a third set of parameters comprising third terminal characterizations;
   determining, at the first terminal, a third token value that is based on the third set of parameters; and
   determining, at the first terminal, that the first token value is greater than the third token value.

4. The method of claim 1, further comprising:
   communicating with a callback proxy in a communications system to receive the second set of parameters.

5. The method of claim 1, further comprising:
receiving a first network parameter and a second network parameter;
combining the first network parameter with the first set of parameters to obtain a modified first set of parameters and the second network parameter with the second set of parameters to obtain a modified second set of parameters; and
determining, by the first terminal, the first token value based on the modified first set and the second token value based on the modified second set.

6. The method of claim 1, further comprising:
publishing, by the first terminal, a first updated parameter when one of the first set of published parameters changes.

7. The method of claim 1, further comprising:
receiving, by the first terminal, a second updated parameter when one of the second set of parameters changes.

8. A method comprising:
publishing, at a first apparatus, a first set of parameters comprising first characterizations of the first apparatus;
establishing a call with a second apparatus;
receiving, at the first apparatus, a second set of parameters comprising second characterizations of the second apparatus;
detecting, at the first apparatus, that a call has dropped;
determining, at the first apparatus, a first token value based on a weighted sum of the first set of parameters and a second token value based on a weighted sum of the second set of parameters;
determining, at the first apparatus, that the first token value is greater than the second token value; and
re-establishing the call with the second apparatus.

9. The method of claim 8, further comprising:
determining, at the first apparatus, whether the dropped call should be re-established based on at least one parameter from one of the sets.

10. The method of claim 8 further comprising:
receiving, at the first apparatus, a first network parameter and a second network parameter;
combining, at the first apparatus, the first network parameter with the first set of parameters to obtain a modified first set of parameters and the second network parameter with the second set of parameters to obtain a modified second set of parameters; and
determining, at the first apparatus, the first token value based on the modified first set and the second token value based on the modified second set.

11. A method comprising:
supporting, at a network device, communications between a first apparatus and a second apparatus;
publishing, at the network device, a first set of parameters comprising first characterizations of the first apparatus;
receiving, at the network device, a second set of parameters comprising second characterizations of the second apparatus;
detecting, at the network device, that the communications has terminated;
determining, at the network device, that the terminated communications should be re-established based on at least one parameter from one of the sets;
determining, at the network device, a first token value based at least in part on a weighted sum of the first set of parameters and a second token value based at least in part on a weighted sum of the second set of parameters; and
facilitating the re-establishing of the communications between the first apparatus and the second apparatus.

12. The method of claim 11, further comprising:
publishing a first updated parameter when one of the first set of parameters changes.

13. The method of claim 11, further comprising:
receiving a second updated parameter when one of the second set of parameters changes.

* * * * *